United States Patent
Olarig et al.

(10) Patent No.: US 11,874,922 B2
(45) Date of Patent: *Jan. 16, 2024

(54) SYSTEM AND METHOD FOR DETECTING MALICIOUS SOFTWARE IN NVME OVER FABRICS DEVICES

(71) Applicant: Samsung Electronics Co., Ltd., Suwon-si (KR)

(72) Inventors: Sompong Paul Olarig, Pleasanton, CA (US); Ramdas P. Kachare, Cupertino, CA (US); Son T. Pham, San Ramon, CA (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

This patent is subject to a terminal disclaimer.

(21) Appl. No.: 17/567,865

(22) Filed: Jan. 3, 2022

(65) Prior Publication Data

US 2022/0129549 A1 Apr. 28, 2022

Related U.S. Application Data

(63) Continuation of application No. 16/801,143, filed on Feb. 25, 2020, now Pat. No. 11,216,557, which is a
(Continued)

(51) Int. Cl.
*G06F 21/56* (2013.01)
*G06F 21/79* (2013.01)
(Continued)

(52) U.S. Cl.
CPC .......... *G06F 21/562* (2013.01); *G06F 21/552* (2013.01); *G06F 21/564* (2013.01);
(Continued)

(58) Field of Classification Search
CPC .... G06F 21/562; G06F 21/564; G06F 21/552; G06F 21/577; G06F 21/79; H04L 63/1416
See application file for complete search history.

(56) References Cited

U.S. PATENT DOCUMENTS 7,761,605 B1 7/2010 Rothwell et al.
8,392,428 B1 3/2013 Bonwick et al.
(Continued)

OTHER PUBLICATIONS

Chen, Ming et al., "SeMiNAS: A Secure Middleware for Wide-Area Network-Attached Storage," SYSTOR '16, Proceedings of the 9th ACM International on Systems and Storage Conference, Jun. 2016, Article No. 2, pp. 1-13.
(Continued)

*Primary Examiner* — David J Pearson
(74) *Attorney, Agent, or Firm* — Renaissance IP Law Group LLP

(57) ABSTRACT

A system and a method to detect malicious software written to an Ethernet solid-state drive (eSSD). The system includes an Ethernet switch, at least one SSD, and a baseboard management controller (BMC). The Ethernet switch receives write data from a communication network in response to a write command. The at least one SSD receives the write data from the Ethernet switch and stores the received write data. The BMC receives from the at least one SSD the received write data. The BMC determines whether the received write data contains malicious software. The received write data may be contained in a plurality of Ethernet packets in which case the BMC stores the received write data in a scan buffer in an order that is based on an assembled order of the received write data.

20 Claims, 4 Drawing Sheets

Related U.S. Application Data continuation of application No. 15/690,265, filed on Aug. 29, 2017, now Pat. No. 10,586,043.

(60) Provisional application No. 62/501,084, filed on May 3, 2017.

(51) Int. Cl.
*G06F 21/55* (2013.01)
*G06F 21/57* (2013.01)
*H04L 9/40* (2022.01)

(52) U.S. Cl.
CPC ............ *G06F 21/577* (2013.01); *G06F 21/79* (2013.01); *H04L 63/1416* (2013.01)

(56) References Cited

U.S. PATENT DOCUMENTS

| | | |
|---|---|---|
| 8,463,006 B2 | 6/2013 | Prokoski |
| 8,732,829 B2 | 5/2014 | Johnson et al. |
| 9,319,426 B2 | 4/2016 | Webb et al. |
| 9,560,062 B2 | 1/2017 | Khatri et al. |
| 10,586,043 B2 | 3/2020 | Olarig et al. |
| 11,216,557 B2 * | 1/2022 | Olarig .................. G06F 21/562 |
| 2004/0003284 A1 | 1/2004 | Campbell et al. |
| 2005/0216770 A1 | 9/2005 | Rowett et al. |
| 2009/0144332 A1 | 6/2009 | Montgomery |
| 2009/0172499 A1 | 7/2009 | Olbrich et al. |
| 2013/0086311 A1 | 4/2013 | Huang et al. |
| 2014/0373151 A1 | 12/2014 | Webb et al. |
| 2017/0104770 A1 | 4/2017 | Jreij et al. |
| 2017/0288955 A1 | 10/2017 | Yin |
| 2018/0260135 A1 | 9/2018 | Hayashida et al. |

OTHER PUBLICATIONS

Notice of Allowance for U.S. Appl. No. 15/690,265, dated Oct. 28, 2019.
Notice of Allowance for U.S. Appl. No. 16/801,143, dated Aug. 30, 2021.
Office Action for U.S. Appl. No. 15/690,265, dated May 24, 2019.
Office Action for U.S. Appl. No. 16/801,143, dated Apr. 13, 2021.

* cited by examiner

SYSTEM AND METHOD FOR DETECTING MALICIOUS SOFTWARE IN NVME OVER FABRICS DEVICES

CROSS-REFERENCE TO RELATED APPLICATION

This application is a continuation of U.S. patent application Ser. No. 16/801,143, filed on Feb. 25, 2020, now allowed, which is a continuation of U.S. patent application Ser. No. 15/690,265, filed on Aug. 29, 2017, now U.S. Pat. No. 10,586,043, issued Mar. 10, 2020, which claims the priority benefit under 35 U.S.C. § 119(e) of U.S. Provisional Patent Application No. 62/501,084, filed on May 3, 2017, the disclosures of which are incorporated herein by reference in their entirety.

TECHNICAL FIELD

The subject matter disclosed herein generally relates to storage systems, and more particularly, to a system and a method for detecting malicious software written to an Ethernet solid-state drive (eSSD) system.

BACKGROUND

Ethernet-attached non-volatile memory express (NVMe) SSDs (e.g., NVMe Over Fabrics (NVMe-oF) storage devices) are considered to be a new, emerging, and disruptive technology. Optimizing Ethernet and SSD cost-performance may be challenging for NVMe-oF devices. While the speed of the Ethernet increased significantly with the advent of 50G/100G technology, SSD input/output (I/O) performance relates primarily to a Peripheral Component Interconnect Express (PCIe) interface and to NAND technology. Fabric-attached SSDs present additional design challenges in order to support erasure-code data protection because each device provides point-to-point connectivity, so using an ASIC, such as a Raid on Chip (ROC), that is external to the fabric-attached SSD increases latency and degrades performance. Moreover, NVMe-oF protocols do not set forth security or virus-scan features.

SUMMARY

An embodiment provides a system that includes an Ethernet switch, at least one SSD and a baseboard management controller (BMC). The Ethernet switch may receive write data from a communication network in response to a write command. The at least one SSD may be coupled to the Ethernet switch, and may receive the write data from the Ethernet switch and store the received write data. The BMC may be coupled to the at least one SSD and may receive from the at least one SSD the received write data and may determine whether the received write data contains malicious software. In one embodiment, at least one SSD may be coupled to the BMC through a PCIe-based communication link, and the BMC may receive the write data over the PCIe-based communication link. The received write data may be contained in a plurality of Ethernet packets, and the BMC may store the received write data in a scan buffer in an order that is based on an assembled order of the received write data.

Another embodiment provides a system that may include an Ethernet switch, a least one SSD and a BMC. The Ethernet switch may receive write data from a communication network in response to a write command. The at least one SSD may be coupled to the Ethernet switch and may receive the write data from the Ethernet switch and store the received write data. The BMC may be coupled to the at least one SSD and may include a memory receive from the SSD the received write data. The BMC may further scan the received write data in the memory to determine whether the received write data contains malicious software.

One embodiment provides a method to detect malicious software written to a SSD connected to an Ethernet communication network in which the method may include receiving write data at the SSD over the Ethernet communication network in response to a write command; storing the write data in the SSD; sending the write data to a BMC; scanning at the BMC the write data sent to the BMC; and determining whether the write data contains malicious software.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
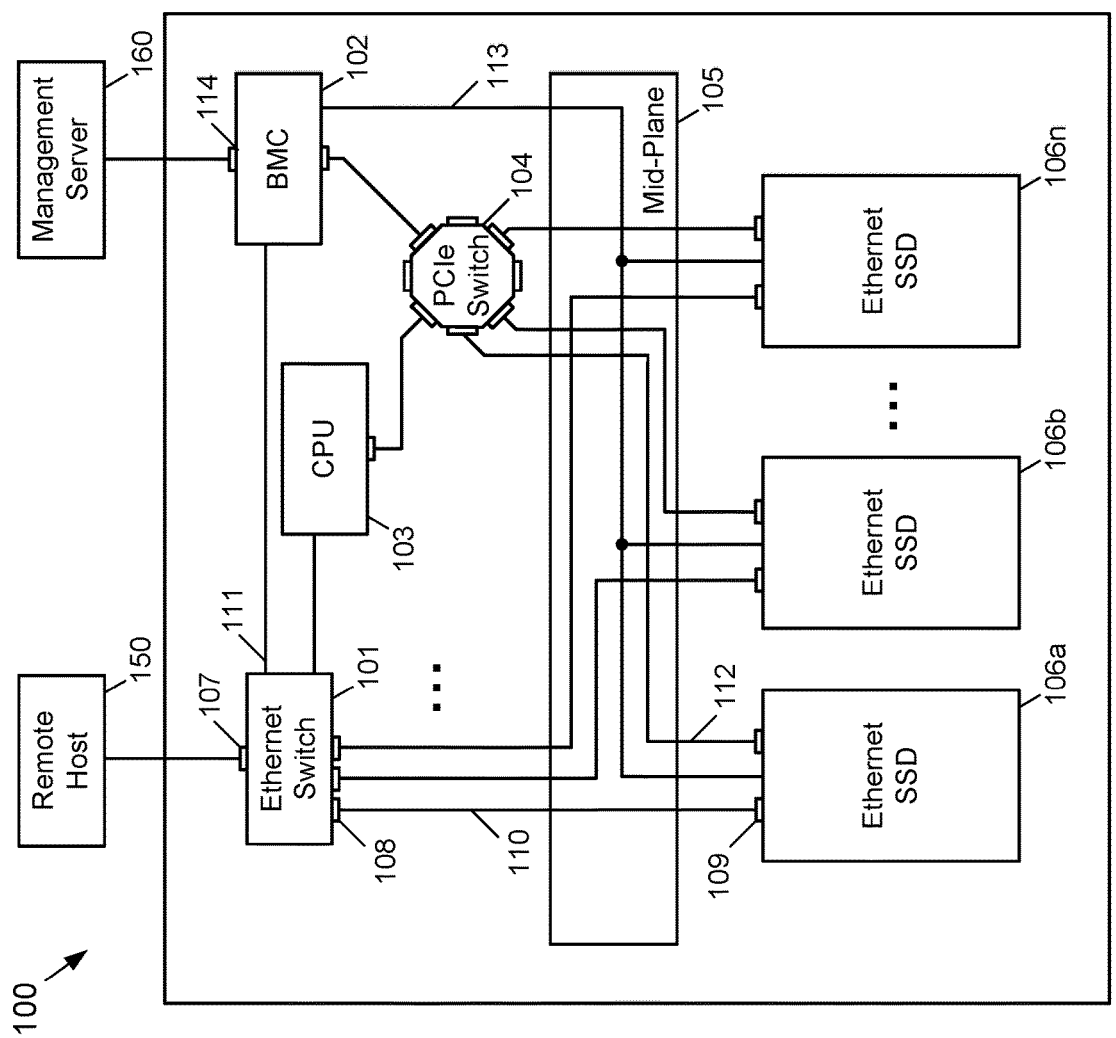
FIG. 1 depicts an example embodiment of a system to detect malicious software written to NVMe-oF devices according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. For example, the term "mod" as used herein means "modulo." It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The term "software," as applied to any implementation described herein, may be embodied as a software package, code and/or instruction set or instructions. The term "hardware," as applied to any implementation described herein, may include, for example, singly or in any combination, hardwired circuitry, programmable circuitry, state-machine circuitry, and/or firmware that stores instructions executed by programmable circuitry. The modules may, collectively or individually, be embodied as software, firmware and/or hardware that forms part of a larger system, such as, but not limited to, an integrated circuit (IC), system on-chip (SoC) and so forth.

The subject matter disclosed herein relates to an eSSD system that includes a secure operating mode that provides malicious-software protection without having a negative impact on data-plane operations (i.e., Ethernet traffic). The secure operating mode provides that incoming data are transferred to a baseboard management controller (BMC) device via a control plane and the BMC device scans the incoming data for any known malicious signatures. If any malicious code signatures are detected, the BMC device may place the infected device under reset (under quarantine) indefinitely and/or notify a system administrator regarding the detected malicious code. In one embodiment, the BMC device utilizes a buffer rolling window to scan for any malicious signatures that may be located across more than one Ethernet packets. As used herein, the term "eSSD" (Ethernet-Attached SSD) may be used interchangeably with the term "NVMe Over Fabrics."

FIG. 1 depicts an example embodiment of a system 100 to detect malicious software written to NVMe-oF devices according to the subject matter disclosed herein. The system 100 may include an Ethernet switch 101, a BMC device 102, a central processing unit (CPU) 103, a PCIe switch 104, a mid-plane 105, and one or more eSSDs 106a-106n.

Although only one Ethernet switch 101 and only one PCIe switch 104 are depicted as being part of the system 100, it should be understood that system 100 may include multiple Ethernet switches 101 and/or multiple PCIe switches 104. Additionally, the components forming the system 100, i.e., the Ethernet switch 101, the BMC 102, the CPU 103, the PCIe switch 104, the eSSDs, etc., may be embodied as separate components or as separate modules. Alternatively, two or more of the components or modules forming the system 100 may be integral with each other.

The system 100 may be physically embodied as a chassis, or as a rack, in which one or more of the eSSDs 106 may be locally arranged with respect to the system 100. One or more additional eSSDs 106 (not shown) may also be remotely located with respect to the system 100. In one embodiment, the system 100 may include 24 eSSDs 106. In another embodiment, the system 100 may include 48 eSSDs 106. In still another embodiment, the system 100 may include any number of eSSDs 106. In one embodiment, the eSSDs 106 may be logically organized into one or more subsets of eSSDs 106 in which each subset may include one or more management policies that are applied to the subset.

The Ethernet switch 101 may include a plurality of uplink Ethernet ports 107, of which only one up-link port 107 is depicted in FIG. 1. The uplink ports 107 may connect the Ethernet switch 101 to one or more remote hosts 150, of which only one host 150 is depicted. The uplink port 107 of the Ethernet switch 101 that connects to the remote host 150 may be a high-bandwidth link. In one embodiment, the uplink ports 107 of the Ethernet switch 101 may include multiple 25 Gbit/s, 40 Gbit/s and/or 100 Gbit/s links.

The Ethernet switch 101 also may include a plurality of downlink Ethernet ports 108. The downlink ports 108 may connect the Ethernet switch 101 through the mid-plane 105 to Ethernet ports 109 on individual eSSDs 106. In one embodiment, each eSSD 106 may include an Ethernet port 109. In another embodiment, each eSSD 106 may include one or more Ethernet ports 109. In one embodiment, the individual eSSDs 106 may have a 10 Gbit/s and/or a 25 Gbit/s Ethernet port 109.

In one embodiment, the BMC device 102 may be located in a main switch board that is part of the system 100. In another embodiment, the BMC device 102 and the Ethernet switch 101 may be integral with each other. The BMC device 102 may be configured to provide management functions, such as, but not limited to, discovery, configuration, operational status, and health monitoring of each respective eSSDs 106. The BMC device 102 may also scan data written to the eSSDs 106 for malicious software.

In one embodiment of the system 100, there may be three communication paths between the BMC device 102 and the eSSDs 106 that may be used for the management functions provided by the BMC device 102. A first communication path may be over an Ethernet network 111 through the Ethernet switch 101. A second communication path may be over a PCIe link, or bus, 112 through the PCIe switch 104 and the mid-plane 105. A third path may be through a System Management Bus (SMBus) 113 that is connected between the BMC device 102 and the eSSDs 106. The BMC device 102 may also include a management port 114 through which a management server 160 that is operated by an administrator (a user) may communicate with and control the BMC device 102. The management server 160 may be located in proximity to or remotely from the eSSD control platform 100. The BMC device 102 may receive management information from the management server 160 relating to one or more eSSDs 106 that may be used to control and manage the one or more eSSDs 106.

The CPU 103 may be coupled to the Ethernet switch 101 to manage and/or control operation of the Ethernet switch 101. In one embodiment, the CPU 103 may run software-defined (SW-defined) network protocols. The CPU 103 may also be connected to the PCIe bus 112.

In one embodiment, a workload submitted by a remote host 150 may use a protocol that is based on the NVMe-oF specification to send read/write IO commands to the eSSDs 106. For host write commands, an eSSD 106 transfers user data from the remote host 150 to the local media of an eSSD 106. For host read commands, an eSSD 106 transfers user data from the local media of the eSSD 106 to the remote host 150.

System 100 includes a non-secure operating mode and a secure operating mode. In the non-secure operating mode, the system 100 operates without detecting any malicious software that may be written to an eSSD 106 of the system 100. In the secure operating mode, the system 100 operates to detect any malicious software that may be written to an eSSD 106.

Figure 2:
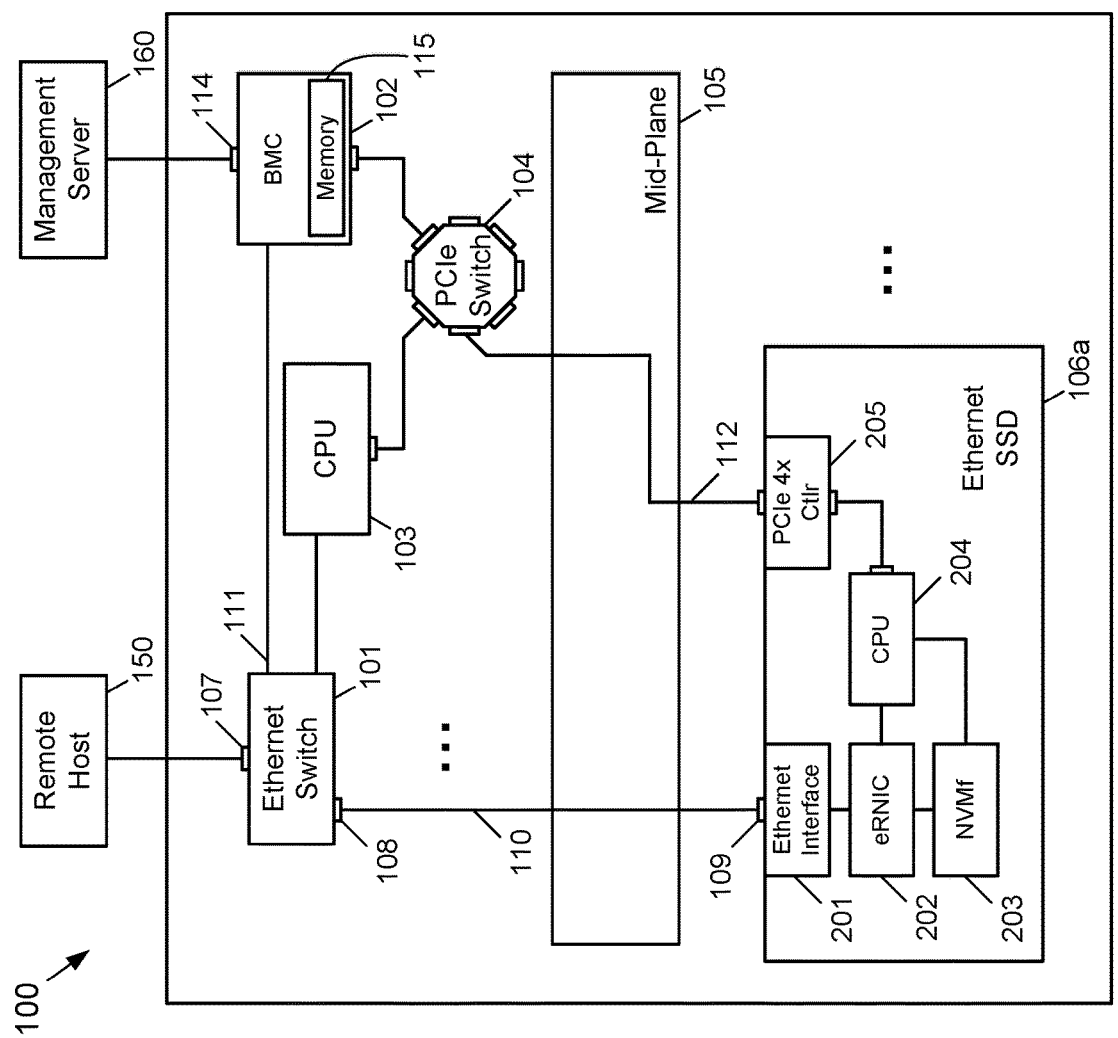
FIG. 2 depicts additional details of the example system depicted in FIG. 1 to detect malicious software according to the subject matter disclosed herein.

FIG. 2 depicts additional details of the example system 100 to detect malicious software according to the subject matter disclosed herein according to the subject matter disclosed herein. The eSSD 106a may include an Ethernet interface 201, an Ethernet remote direct memory access (RDMA) enabled network interface card (NIC) (eRNIC) 202, an NVMf 203, a CPU 204 and a PCIe controller 205. In one embodiment, the NVMf 203 may include flash memory, and the PCIe controller 205 may be configured to provide four lanes connected to the PCIe link 112.

Ethernet packets containing data that are to be written to the eSSD 106a may be received at the Ethernet interface 201 from, for example, the remote host 150 over an Ethernet link 110 coupled to the Ethernet port 109. The received Ethernet packets are transferred through the eRNIC 202 to the NVMf 203. The CPU 204 may provide control that may be used for receiving and storing the received data in the NVMf 203. Data that is to be read from the eSSD 106a essentially follows a reverse path from the NVMf 203 to, for example, the remote host 150.

Figure 3:
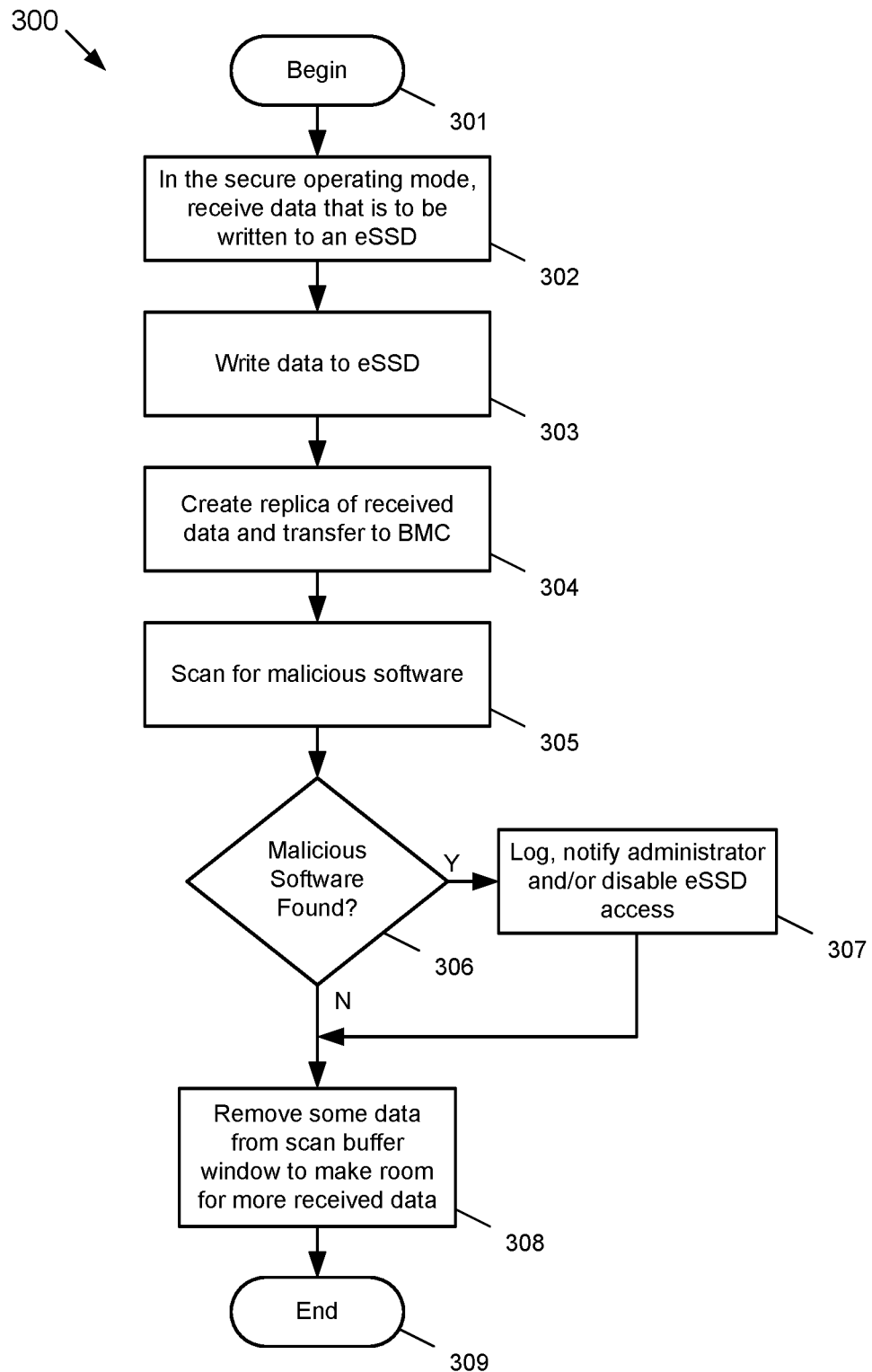
FIG. 3 depicts a flow diagram of an example process of a secure operational mode that may be used by the example system depicted in FIG. 1 according to the subject matter disclosed herein.

FIG. 3 depicts a flow diagram of an example process 300 of a secure operational mode that may be used by the example system 100 depicted in FIG. 1 according to the subject matter disclosed herein. With reference to both FIG. 2, the secure operating mode begins at 301 in FIG. 3. At 302, Ethernet packets containing data that are to be written to the eSSD 106a may be received via the Ethernet link 110 coupled to the Ethernet port 109. At 303, the received data is transferred through the eRNIC 202 to the NVMf 203.

At 304, a replica of the received Ethernet packets is transferred by the CPU 204 through the PCIe controller 203 to the BMC device 102 over the PCIe link 112. The replica of the received Ethernet packets is written into a memory 115 (shown in FIG. 2) where it may be assembled into the received data. The BMC 102 may scan the assembled data for malicious software to determine whether the received data contains any virus codes or malicious signatures at 305. If, at 306, the BMC device 102 determines that malicious software is contained in the received data, flow continues to 307 where the BMC device 102 may perform one or more appropriate actions, such as, but not limited to, logging the detection of malicious software, notifying a storage administrator of the detection of malicious software, and/or disabling access to the eSSD 106a. In one embodiment, the BMC device 102 may assert the reset pin of an infected eSSD 106 until, for example, the eSSD 106 is removed from the system or power is removed from the infected eSSD 106.

Figure 4:
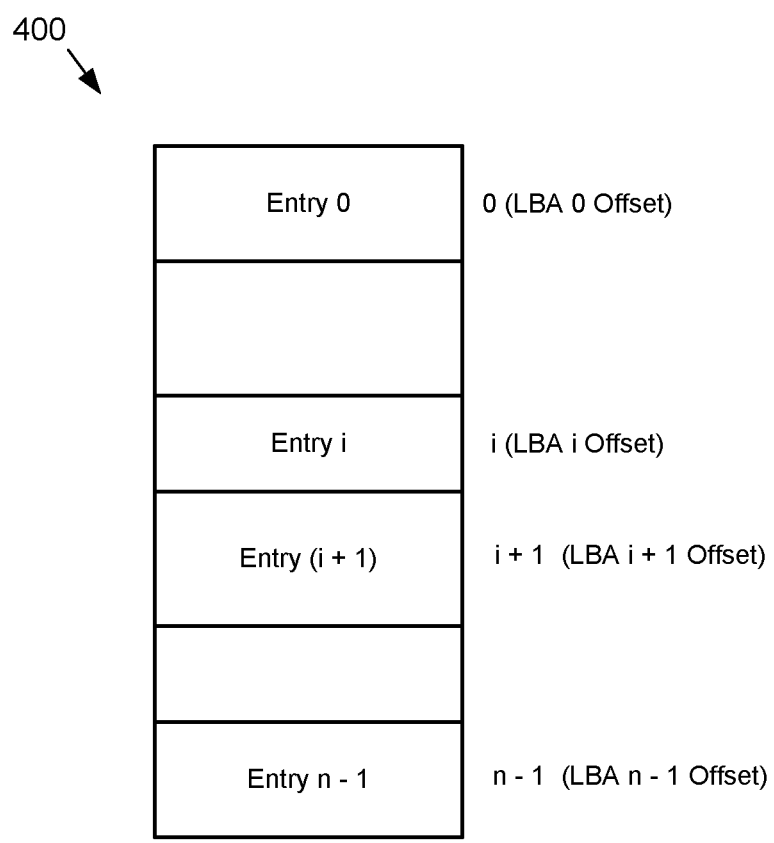
FIG. 4 depicts an example embodiment of a scan buffer window according to the subject matter disclosed herein.

The data received at 302 may be associated with LBAs (Logical Block Addresses) in which case at 304 the CPU 204 replicates and transfers to the BMC device 102 the received Ethernet packets along with all associated LBAs using the PCIe interface 205. At 305, the BMC device 102 assembles the received data into a local memory 115 (FIG. 2). The received data may be arranged in the memory 115 as a scan buffer window 400. FIG. 4 depicts an example embodiment of a scan buffer window 400 according to the subject matter disclosed herein. As depicted in FIG. 4, a replica of received data is assembled based on LBAs associated with the received data (entries) to thereby enable the BMC device 102 to detect any malicious signatures located on the boundaries of adjacent Ethernet packets. The BMC device 102 may implement various algorithms and policies to efficiently scan the buffer as well as manage the buffer space. In one embodiment, the BMC device 102 may maintain a database of virus signature scans and may update the database from time to time.

In one embodiment, an eSSD may provide additional information to the BMC device 102 that relates to, for example, a format of the data, such as file or object, or affinity of the LBA ranges. Such information may be used by the BMC device 102 to more efficiently perform a virus scans. The information may also be used by the BMC device 102 to more optimally organize the scan buffer.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A system, comprising:
   a network switch to receive write data from a communication network; and
   a device to receive the write data in a buffer in an order that is based on a first logical address and a second logical address associated with the write data,
   wherein the device is configured to scan the write data using the buffer to determine that the write data contains malicious content.

2. The system of claim 1, wherein:
   the device is configured to update a database of malicious content information; and
   the device is configured to scan the write data based the database of malicious content information.

3. The system of claim 1, further comprising a storage device coupled to the network switch and to the device, the storage device to receive the write data and store the write data, wherein:
   the storage device includes a terminal; and based on the device determining that the write data contains malicious content, the device is configured to assert the terminal.

4. The system of claim 3, wherein:
the device is configured to detect a change of status of the storage device and, based on the change of status of the storage device, change a status of the terminal.

5. The system of claim 3, wherein the storage device is coupled to the device using at least one of a communication link or a system management bus.

6. The system of claim 1, wherein the device is configured to:
log detection of the malicious content; and
send a notification of the detection of the malicious content.

7. The system of claim 1, wherein:
the write data is contained in a first packet and a second packet; and
the device is configured to detect malicious content located on a boundary of the first packet and the second packet.

8. The system of claim 1, wherein the device comprises:
a storage medium;
a network interface; and
at least one processor configured to:
control receiving write data using the network interface;
control storing the write data in the storage medium;
control replicating the write data to generate replicated date; and control transferring the replicated data to a device using a control plane.

9. The system of claim 8, wherein the replicated data is transferred to the device using the network interface.

10. The system of claim 8, wherein the replicated data is transferred to the device using a communication link.

11. The system of claim 10, wherein the communication link comprises an interconnect link.

12. The system of claim 10, wherein the communication link comprises a system management bus.

13. The system of claim 8, wherein:
at least a portion of the write data is associated with a logical block address (LBA); and
the at least one processor is configured to transfer the LBA using the control plane.

14. A method comprising:
receiving, by a network switch, write data from a communication network;
receiving, by a device, the write data in a buffer in an order that is based on a first logical address and a second logical address associated with the write data;
scanning, by the device, the write data using the buffer; and
determining, by the device, that the write data contains malicious content.

15. The method of claim 14, further comprising:
updating, by the device, a database of malicious content information; and
scanning, by the device, the write data based at least on the database of malicious content information.

16. The method of claim 14, further comprising:
receiving, by a storage device, the write data; and
storing, by the storage device, the write data.

17. The method of claim 16, wherein the storage device includes a terminal, the method further comprising asserting, by the device, the terminal of the storage device.

18. The method of claim 17, wherein the asserting the terminal is based on the device determining that the write data contains malicious content.

19. The method of claim 14, further comprising:
logging, by the device, based on the determining that the write data contains malicious content, detection of the malicious content; and
sending a notification, by the device, of the determining that the write data contains malicious content.

20. The method of claim 14, wherein the write data is contained in a first packet and a second packet, the method further comprising detecting, by the device, malicious content located on a boundary of the first packet and the second packet.

* * * * *